(12) United States Patent
Zeng et al.

(10) Patent No.: US 12,482,898 B2
(45) Date of Patent: Nov. 25, 2025

(54) SEPARATOR HAVING COATING CONTAINING ETHYLENE CARBONATE, SECONDARY BATTERY, BATTERY MODULE, BATTERY PACK, AND POWER CONSUMPTION APPARATUS

(71) Applicant: CONTEMPORARY AMPEREX TECHNOLOGY (HONG KONG) LIMITED, Hong Kong (CN)

(72) Inventors: Yuqun Zeng, Fujian (CN); Chuying Ouyang, Fujian (CN); Chengdong Sun, Fujian (CN); Yi Zheng, Fujian (CN); Haiyang Kang, Fujian (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 35 days.

(21) Appl. No.: 18/202,361

(22) Filed: May 26, 2023

(65) Prior Publication Data

US 2023/0299419 A1    Sep. 21, 2023

Related U.S. Application Data

(63) Continuation of application No. PCT/CN2021/123237, filed on Oct. 12, 2021.

(51) Int. Cl.
| | |
|---|---|
| *H01M 50/449* | (2021.01) |
| *H01M 10/0525* | (2010.01) |
| *H01M 50/403* | (2021.01) |
| *H01M 50/446* | (2021.01) |

(52) U.S. Cl.
CPC ..... *H01M 50/449* (2021.01); *H01M 10/0525* (2013.01); *H01M 50/403* (2021.01); *H01M 50/446* (2021.01)

(58) Field of Classification Search
CPC .............. H01M 50/417; H01M 50/40–469
See application file for complete search history.

(56) References Cited

U.S. PATENT DOCUMENTS

| | | | |
|---|---|---|---|
| 4,199,021 A | 4/1980 | Thoma | |
| 4,258,696 A | 3/1981 | Gopal | |
| 6,337,153 B1* | 1/2002 | Kodama | ............. H01M 50/129 429/178 |

(Continued)

FOREIGN PATENT DOCUMENTS

| | | |
|---|---|---|
| CN | 103155220 A | 6/2013 |
| CN | 104017548 A | 9/2014 |

(Continued)

OTHER PUBLICATIONS

International Search Report and Written Opinion mailed on Jun. 21, 2022, received for PCT Application PCT/CN2021/123237, filed on Oct. 12, 2021, 13 pages including English Translation.

(Continued)

*Primary Examiner* — Imran Akram
(74) *Attorney, Agent, or Firm* — XSENSUS LLP (57) ABSTRACT

The present application provides a separator, a secondary battery, a battery module, a battery pack, and a power consumption apparatus. The separator may include a porous base film and a bonding layer coated on one or both faces of the porous base film. The bonding layer may be composed of ethylene carbonate and an optional nucleating agent.

17 Claims, 2 Drawing Sheets

(56) References Cited

U.S. PATENT DOCUMENTS

| | | | | |
|---|---|---|---|---|
| 2009/0092900 | A1* | 4/2009 | Obana | H01M 50/446 |
| | | | | 429/246 |
| 2011/0144224 | A1* | 6/2011 | Tanaka | H01M 10/052 |
| | | | | 521/142 |
| 2013/0017453 | A1* | 1/2013 | Ajayan | H01M 4/1391 |
| | | | | 205/66 |
| 2013/0089772 | A1 | 4/2013 | Nishikawa | |
| 2013/0330637 | A1* | 12/2013 | Matsumoto | H01M 50/403 |
| | | | | 429/255 |
| 2014/0329140 | A1* | 11/2014 | Mikuni | H01M 4/628 |
| | | | | 429/188 |
| 2016/0036027 | A1 | 2/2016 | Nishikawa | |
| 2018/0191024 | A1* | 7/2018 | Yu | H01M 10/0569 |
| 2020/0044240 | A1* | 2/2020 | Newbound | H01M 4/628 |
| 2020/0313135 | A1* | 10/2020 | Stainer | H01M 10/06 |
| 2020/0411830 | A1* | 12/2020 | Whear | H01M 50/451 |
| 2021/0159536 | A1* | 5/2021 | Harada | H01M 10/0587 |
| 2021/0273217 | A1* | 9/2021 | Park | H01M 4/626 |
| 2022/0021032 | A1* | 1/2022 | Nakajima | H01M 50/443 |
| 2022/0213306 | A1* | 7/2022 | Kuribayashi | H01M 50/426 |
| 2022/0243036 | A1* | 8/2022 | Hersam | C08K 3/04 |

FOREIGN PATENT DOCUMENTS

| | | | | |
|---|---|---|---|---|
| CN | 108780926 | A | | 11/2018 |
| CN | 113300051 | A * | 8/2021 | H01M 10/0587 |
| JP | H02-248460 | A | | 10/1990 |
| JP | 2006172991 | A * | 6/2006 | |
| JP | 2015-115266 | A | | 6/2015 |
| JP | 2015144079 | A * | 8/2015 | |
| JP | 2018-527730 | A | | 9/2018 |
| KR | 101605277 | B1 * | 3/2016 | C01F 7/78 |
| KR | 20180022595 | A * | 3/2018 | G01R 19/165 |
| WO | 2013/133074 | A1 | | 9/2013 |
| WO | 2019/156172 | A1 | | 8/2019 |

OTHER PUBLICATIONS

Extended European Search Report issued Aug. 16, 2023 in European Patent Application No. 21923629.6, 8 pages.

Decision to Grant a Patent issued Apr. 22, 2024 in Patent Application No. 2022-551706 with English translation thereof.

Notice of Reasons for Refusal issued Dec. 18, 2024 in Patent Application No. 2022-551706 with English translation thereof.

Office Action issued Dec. 18, 2023 in Japanese Patent Application No. 2022-551706 with computer-generated English translation.

Office Action issued Aug. 12, 2024 in Korean Patent Application No. 10-2022-7029357 with English translation thereof.

Yushi Liu et al. "Use of nano-$\alpha$-Al2O3 to improve binary eutectic hydrated salt as phase change material", Solar Energy Materials & Solar Cells. vol. 160, p. 18-25, Oct. 24, 2016.

* cited by examiner

SEPARATOR HAVING COATING CONTAINING ETHYLENE CARBONATE, SECONDARY BATTERY, BATTERY MODULE, BATTERY PACK, AND POWER CONSUMPTION APPARATUS

CROSS-REFERENCE TO RELATED APPLICATION

The present application is a continuation of International Application No. PCT/CN2021/123237, filed Oct. 12, 2021, the entire content of which is incorporated herein by reference in its entirety.

TECHNICAL FIELD

The present application relates to the field of battery technologies, and in particular, to a separator, a secondary battery, a battery module, a battery pack, and a power consumption apparatus.

BACKGROUND

Lithium-ion batteries have become the most popular secondary batteries due to characteristics of high energy density, fast charging and discharging, high charging efficiency, high output power, excellent cycle and storage performance, and no memory effect. In 2020, global lithium-ion battery shipments reach 294.5 GWh, of which the Chinese market is 158.5 GWh. Thanks to the unexpected growth of the new energy vehicle market in Europe, global automotive power battery shipments have increased by 26.4% year on year, to 158.2 GWh, of which the Chinese market is 84.5 GWh.

In a structure of a lithium-ion battery, a separator is one of the key inner layer assemblies. The separator is disposed between a positive electrode sheet and a negative electrode sheet, to play an effect of isolation. The performance of the separator determines an interface structure and internal resistance of a battery, which directly affects a capacity, cycle, and safety performance of the battery. The separator with excellent performance plays an important role in improving the overall performance of the battery. Commercially available materials for the separator are mainly polyethylene and polypropylene microporous films. The separator may be coated with a temperature-resistant material to improve the heat resistance of the polyolefin film. The separator may also be coated with a bonding material, and the coated separator may generate bonding force with an electrode during the assembling of the battery, so as to match a battery producing process and improve safety of the battery.

In recent years, manufacturing processes of polyethylene and polypropylene microporous films have been relatively mature, and innovative research has focused on imparting new properties to the separator by designing coatings with different materials and functions. In order to achieve adhesion between the separator and the electrode sheet, persons skilled in the art design various formulations, in which various bonding agents, dispersants, wetting agents, solvents, fillers, or the like are added to materials for a coating, in order to produce a coated separator with better performance. However, a complex design often introduces more uncontrollable factors, and the addition of various adjuvants also produces side reactions in an electrochemical process of the battery, which affects the overall performance of the battery. A complex design needs to be implemented by complicated manufacturing processes, which also results in poor product manufacturability and increased costs.

SUMMARY

Lithium batteries in the prior art all use a polymer material as a bonding material, which is coated on a surface of a separator by compounding the polymer material with an oily or water-based bonding agent or by dissolving it in a solvent. The polymeric material may create a bonding effect in two ways. The first way is to perform heat pressing. The polymer melts when heated to generate a bonding force, and the selected polymer material in the prior art has a high melting point and a high melt viscosity, and thus hot pressing generally needs to be performed above 90° C. Since it takes a certain time to transfer heat from a surface of a battery cell to an interior portion during hot pressing, time for the hot pressing generally exceeds 30 seconds, and the polymer material has a high melt viscosity, poor infiltration at a low temperature, and a low bonding force. The second way is to form a gel state with the solvent, resulting in viscosity, which is not suitable for producing square battery cells.

The polymer material coated on the separator may form a polymer film on the surface of the separator, which blocks pores of the separator and blocks transport of lithium ions, resulting in a decrease in kinetic performance of a lithium-ion battery. In addition, a polymer film layer of the separator occupies an internal space of the battery, resulting in a decrease in energy density of the battery. In addition, the added polymer materials and adjuvants may also cause side reactions during the production and use of the battery, which reduces first efficiency and performance of the battery.

In order to overcome the foregoing technical problems, the inventor surprisingly found that: with ethylene carbonate and an optionally added nucleating agent as a bonding agent of a separator, and without the use of other bonding agents (such as polymer bonding agents), good adhesion of the separator and the electrode sheet of the battery may be quickly achieved below 50° C., and hot-pressing time may be greatly shortened.

In order to achieve the foregoing objective, the present application provides a separator, a method for producing the same, a secondary battery, a battery module including the secondary battery, a battery pack including the battery module, and a power consumption apparatus including the secondary battery, the battery module or the battery pack.

According to a first aspect of the present application, a separator is provided, including a porous base film and a bonding layer coated on one or both faces of the porous base film, the bonding layer being composed of ethylene carbonate and an optional nucleating agent.

In some embodiments, the bonding material layer is composed of the ethylene carbonate and the nucleating agent, where a mass percentage of the ethylene carbonate is 90-100%. In some embodiments, a mass percentage of the ethylene carbonate is 99-100%.

In some embodiments, the nucleating agent is an inorganic nucleating agent, an organic nucleating agent, or a combination thereof.

In some embodiments, the nucleating agent is an inorganic nucleating agent, and an amount of the nucleating agent added is 0%-10%, optionally 0.05%-1%.

In some embodiments, the inorganic nucleating agent is one or more of a metal or non-metal oxide (such as silica, alumina, calcium oxide, magnesium oxide), a hydroxide (such as aluminum hydroxide, magnesium hydroxide), a fluoride (such as calcium fluoride), a sulfate (such as sodium sulfate, magnesium sulfate, calcium sulfate, barium sulfate), a silicate (such as aluminum silicate, magnesium silicate, lithium silicate, sodium silicate), a phosphate (such as sodium phosphate, calcium phosphate, iron phosphate), a carbonate (such as calcium carbonate, magnesium carbonate), and carbon black.

In some embodiments, the inorganic nucleating agent is one or more of silica, alumina, and aluminum hydroxide.

In some embodiments, the silica is a nano silicon micropowder. In some embodiments, the nano silicon micro powder has a primary particle size of 70-80 nm.

In some embodiments, the organic nucleating agent is one or more of a metal alkyl compound (such as calcium stearate), and a metal carboxylate (such as calcium oxalate, calcium citrate).

In some embodiments, the organic nucleating agent is calcium stearate.

In some embodiments, the nucleating agent is a powder, and has a particle size expressed by D50 of 0.001-5 μm.

In some embodiments, the nucleating agent has a particle size expressed by D50 of 0.005-2 μm.

In some embodiments, a material of the porous base film is one or more of polypropylene, polyethylene, polyethylene terephthalate, polyimide, polytetrafluoroethylene, polyvinylidene fluoride, vinylidene fluoride-tetrafluoroethylene copolymer, vinylidene fluoride-hexafluoropropylene copolymer, tetrafluoroethylene-propylene copolymer, polyamide, polyacrylonitrile, viscose fiber, and silk fiber. In some embodiments, a material of the porous base film is one or more of polyethylene, polypropylene, and polyimide.

In some embodiments, the porous base film has a thickness of 5-30 μm.

In some embodiments, the bonding layer is a continuous coating or a discontinuous coating.

In some embodiments, the bonding layer has a coverage of 1-100%, optionally 10-20%.

In some embodiments, the bonding layer has a thickness of 0.1-100 μm, optionally 0.2-20 μm.

According to a second aspect of the present application, a method for producing a separator is provided, including: coating a bonding material onto one or both faces of a porous base film, and cooling and solidifying the bonding material in an environment at or below room temperature to form a bonding layer, the bonding material being composed of molten ethylene carbonate, and an optional nucleating agent.

In some embodiments, the method further includes:
step 1: melting the ethylene carbonate between 40° C. and 100° C., or mixing the molten ethylene carbonate with the nucleating agent, to obtain the bonding material, where a mass fraction ratio of the ethylene carbonate to the nucleating agent is 90%-100%: 0%-10%; and
step 2: after the bonding material is coated onto one or both faces of the porous base film, performing cooling at room temperature (such as 25° C.) or at 7-15° C. with a low-temperature auxiliary, to obtain the separator.

In some embodiments, the nucleating agent is one or more of silica, alumina, and aluminum hydroxide.

In some embodiments, an amount of the nucleating agent added is 0.05%-1%.

In some embodiments, the coating is performed by using one or more of roller coating, spray coating, and dip coating.

In some embodiments, the coating has a coating weight of 0.5-20 g/m².

In some embodiments, a separator produced by the method is the separator described in the first aspect of the present application.

According to a third aspect of the present application, use of ethylene carbonate as a bonding material for producing a separator of a secondary battery is provided.

According to a fourth aspect of the present application, a secondary battery is provided, including an electrode assembly and an electrolytic solution, the electrode assembly including a positive electrode sheet, a negative electrode sheet, and a separator, the positive electrode sheet including a positive electrode tab, and the negative electrode sheet including a negative electrode tab, where the separator is the separator of the first aspect of the present application.

According to a fifth aspect of the present application, a battery module is provided, including the secondary battery of the fourth aspect of the present application.

According to a sixth aspect of the present application, a battery pack is provided, including the battery module of the fifth aspect of the present application.

According to a seventh aspect of the present application, a power consuming apparatus is provided, including the secondary battery of the fourth aspect of the present application, the battery module of the fifth aspect of the present application, or the battery pack of the sixth aspect of the present application.

As for a separator of the present invention, ethylene carbonate and an optional nucleating agent are used as a bonding material, so that good adhesion of the separator to an electrode sheet of a battery may be quickly achieved below 50° C., and hot-pressing time may be greatly shortened. A secondary ion battery is assembled using the separator of the present invention, and after an electrolytic solution is injected, the ethylene carbonate in the bonding material dissolves to become a component of the electrolytic solution, so that coverings on a surface of the separator may be reduced by 99% or more, and pores of the separator may be kept to the greatest extent. Compared with the existing technical solutions, a battery produced using the separator has better kinetic performance, no side reaction substances are introduced, and the bonding material does not occupy space of the battery, thereby improving energy density of the battery.

DESCRIPTION OF REFERENCE SIGNS 1 battery pack; 2 upper box; 3 lower box; 4 battery module; 5 secondary battery; 51 housing; 52 electrode assembly; 53 top cover assembly.

DESCRIPTION OF EMBODIMENTS

Embodiments of the present application will be further described below in detail with reference to the embodiments. The detailed description of the following embodiments is used to exemplarily illustrate principles of the present application, but cannot be used to limit the scope of the present invention, that is, the present application is not limited to the described embodiments.

Hereinafter, embodiments that specifically disclose a secondary battery, a method for producing the same, a battery module, a battery pack, and a power consumption apparatus of the present application will be described in detail. However, unnecessarily detailed descriptions may be omitted in some cases. For example, detailed descriptions of well-known matters and repeated descriptions of practically identical structures are omitted. This is done to avoid unnecessarily redundant descriptions for ease of understanding by persons skilled in the art.

A "range" disclosed herein is defined in the form of a lower limit and an upper limit. A given range is defined by selecting a lower limit and an upper limit, and the selected lower limit and upper limit define a boundary of a particular range. The range defined in this manner may or may not include end values, and may be combined arbitrarily, that is, any lower limit may be combined with any upper limit to form a range. For example, if ranges of 60-120 and 80-110 are listed for a particular parameter, it is understood that ranges of 60-110 and 80-120 are also contemplated. In addition, if the minimum range values listed are 1 and 2, and the maximum range values listed are 3, 4 and 5, all the following ranges are contemplated: 1-3, 1-4, 1-5, 2-3, 2-4, and 2-5. In the present application, unless otherwise specified, a numerical range "a-b" represents an abbreviated representation of any combination of real numbers between a and b, where both a and b are real numbers. For example, a numerical range "0-5" means that all real numbers between "0-5" have been listed herein, and "0-5" is just an abbreviated representation of a combination of these numerical values. In addition, when a certain parameter is expressed as an integer$\geq$2, it is equivalent to disclosing that the parameter is, for example, an integer of 2, 3, 4, 5, 6, 7, 8, 9, 10, 11, 12, or the like.

Unless otherwise specified, all embodiments and optional embodiments of the present application may be combined with each other to form a new technical solution.

Unless otherwise specified, all technical features and optional technical features of the present application may be combined with each other to form a new technical solution.

Unless otherwise specified, all steps of the present application may be performed sequentially or randomly, but preferably, performed sequentially. For example, a method includes steps (a) and (b), which means that the method may include steps (a) and (b) performed sequentially, or steps (b) and (a) performed sequentially. For example, the method mentioned may further include step (c), which means that step (c) may be added to the method in any order, for example, the method may include steps (a), (b) and (c), steps (a), (c) and (b), steps (c), (a) and (b), or the like.

Unless otherwise specified, "comprising" and "containing" mentioned in the present application are open-ended or closed-ended. For example, the "comprising" and "containing" may mean that other components that are not listed may further be comprised or contained, or only listed components may be comprised or contained.

In the present application, unless otherwise specified, the term "or" is inclusive. For example, the phrase "A or B" means "A, B or both A and B". More particularly, a condition "A or B" is satisfied by any one of the following: A is true (or present) and B is false (or not present); A is false (or not present) and B is true (or present); or both A and B are true (or present).

Separator

As mentioned in Background, the existing coated separator of the secondary battery has problems of high hot-pressing temperature, and low bonding strength, the coating material affects transport of lithium ions, the first efficiency of the battery is reduced due to side reactions of the coating material, and the coating material occupies the internal space of the battery, which reduces the energy density of the battery.

Based on the foregoing problems, the present application provides a separator that may achieve good adhesion of the separator to an electrode sheet of a battery below 50° C., and hot-pressing time may be greatly shortened to less than 3 s. A secondary battery is assembled using the separator of the present application, and after an electrolytic solution is injected, ethylene carbonate as a bonding material dissolves, and pores of the separator are not blocked, and may be kept to the greatest extent. Compared with the existing technical solutions, a battery produced using the separator has better kinetic performance, no side reaction substances are introduced, and the bonding material does not occupy space of the battery, thereby improving energy density of the battery.

According to a first aspect of the present application, a separator for a secondary battery is provided, including a porous base film and a bonding layer coated on one or both faces of the porous base film, the bonding layer being composed of ethylene carbonate and an optional nucleating agent.

Ethylene carbonate has a melting point of about 35° C. and is a solid at room temperature, melts after being heated, and solidifies into a solid after being cooled to room temperature of 25° C. again. After a porous separator is coated with ethylene carbonate and made into a battery together with an electrode sheet, under the condition of heating, the ethylene carbonate melts after being heated, wets the porous separator and the electrode sheet, and solidifies after being cooled, so that the separator and the electrode sheet may be bonded.

In order to improve the problem of occurrence of the supercooling phenomenon of pure ethylene carbonate in the cooling process, that is, the ethylene carbonate remains in a liquid form below the melting point temperature, a chemically stable nucleating agent is added to the ethylene carbonate in the present invention, and the nucleating agent functions as a nucleation site during the cooling crystallization process, so as to avoid the problem of the supercooling and difficult solidification of the ethylene carbonate.

In some embodiments, the bonding material layer is composed of ethylene carbonate and a nucleating agent, where a mass percentage of the ethylene carbonate is 90-100%, such as 90%, 91%, 92%, 93%, 94%, 95%, 96%, 97%, 98%, 99% or 100%. In some embodiments, a mass percentage of the ethylene carbonate is 99-100%.

The nucleating agent may be an inorganic nucleating agent, an organic nucleating agent, or a combination thereof. The nucleating agent is electrochemically inactive, does not intercalate lithium ions, is capable of being well dispersed in ethylene carbonate, and provides a nucleation site during crystallization and solidification.

In some embodiments, the nucleating agent is an inorganic nucleating agent and an amount of the nucleating agent added is 0%-10% such as 0.01%-0.05%, 0.05%-

0.06%, 0.06%-0.07%, 0.07%-0.08%, 0.08%-0.09%, 0.09%-1%, 1%-3%, 3%-5%, 5%-8%, 8%-9% or 9%-10%, preferably 0.05%-1%.

In some embodiments, the inorganic nucleating agent is one or more of a metal or non-metal oxide (such as silica, alumina, calcium oxide, magnesium oxide), a hydroxide (such as aluminum hydroxide, magnesium hydroxide), a fluoride (such as calcium fluoride), a sulfate (such as sodium sulfate, magnesium sulfate, calcium sulfate, barium sulfate), a silicate (such as aluminum silicate, magnesium silicate, lithium silicate, sodium silicate), a phosphate (such as sodium phosphate, calcium phosphate, iron phosphate), a carbonate (such as calcium carbonate, magnesium carbonate), and carbon black. In some embodiments, the inorganic nucleating agent is one or more of silica, alumina, and aluminum hydroxide.

In some embodiments, the silica used as the nucleating agent is a nano silicon micropowder. In some embodiments, the nano silicon micropowder has a primary particle size of 70-80 nm.

In some embodiments, the organic nucleating agent is one or more of a metal alkyl compound (such as calcium stearate), and a metal carboxylate (such as calcium oxalate, calcium citrate). In some embodiments, the organic nucleating agent is calcium stearate.

In some embodiments, the form of the nucleating agent is a powder, and has a particle size expressed by D50 of 0.001-5 µm, for example, 0.001 µm-0.005 µm, 0.005 µm-0.01 µm, 0.01 µm-0.05 µm, 0.05 µm-0.1 µm, 0.1 µm-0.5 µm, 0.5 µm-1 µm, 1 µm-2 µm or 2 µm-5 µm. In some embodiments, the nucleating agent has a particle size expressed by D50 of 0.005-2 µm.

The type of the porous base film is not particularly limited, and any known porous base film with good chemical stability and mechanical stability may be selected. In some embodiments, a material of the porous base film is one or more of polypropylene, polyethylene, polyethylene terephthalate, polyimide, polytetrafluoroethylene, polyvinylidene fluoride, vinylidene fluoride-tetrafluoroethylene copolymer, vinylidene fluoride-hexafluoropropylene copolymer, tetrafluoroethylene-propylene copolymer, polyamide, polyacrylonitrile, viscose fiber, and silk fiber. In some embodiments, a material of the porous base film is one or more of polyethylene, polypropylene, and polyimide.

The thickness of the porous base film is also not particularly limited. In some embodiments, the porous base film has a thickness of 5-30 µm, for example, 5 µm-10 µm, 10 µm-12 µm, 12 µm-15 µm, 15 µm-20 µm, or 20 µm-30 µm.

In the separator of the present invention, the bonding layer may be a continuous coating or a discontinuous coating. When the bonding layer is a discontinuous coating, its coverage is not particularly limited and may be 1%-100%, for example, 1-10%, 10-20%, 20-30%, 30-40%, 40-50%, 50-60%, 60-70%, 70-80%, 80-90%, or 90%-100%. In some embodiments, the coverage may be 10-20%.

In the separator of the present invention, the thickness of the bonding layer is not particularly limited. In some embodiments, the bonding layer has a thickness of 0.1-100 µm, such as 0.2-0.5 µm, 0.5-1 µm, 1-2 µm, 2-5 µm, 5-10 µm, 10-20 µm, 20-50 µm, 50 µm-70 µm or 70 µm-100 µm, preferably 0.2-20 µm.

The separator of the present invention may be a single-layer film or a multi-layer composite film, which is not particularly limited. When the separator is a multi-layer composite film, the materials of each layer may be the same or different, which is not particularly limited.

According to a second aspect of the present application, a method for producing a separator of a secondary battery is provided. The production method of the present invention includes: coating a bonding material onto one or both faces of a porous base film, and cooling and solidifying the bonding material in an environment at or below room temperature to form a bonding layer, the bonding material being composed of molten ethylene carbonate, and an optional nucleating agent.

In some embodiments, the method further includes:
step 1: melting the ethylene carbonate between 40° C. and 100° C., or mixing the molten ethylene carbonate with the nucleating agent, to obtain the bonding material, where a mass fraction ratio of the ethylene carbonate to the nucleating agent is 90%-100%: 0%-10%; and
step 2: after the bonding material is coated onto one or both faces of the porous base film, performing cooling at room temperature (such as 25° C.) or at 7-15° C. with a low-temperature auxiliary, to obtain the separator.

In some embodiments, the nucleating agent is one or more of silica, alumina, and aluminum hydroxide.

In some embodiments, an amount of the nucleating agent added is 0.05%-1%, for example, 0.05%-0.06%, 0.06%-0.07%, 0.07%-0.08%, 0.08%-0.09%, or 0.09%-1%.

In some embodiments, the coating is performed by using one or more of roller coating, spray coating, and dip coating.

In some embodiments, the coating has a coating weight of 0.5-20 g/m$^2$, for example, 0.5-1 g/m$^2$, 1-1.5 g/m$^2$, 1.5-2 g/m$^2$, 2-5 g/m$^2$, 5-7 g/m$^2$, 7-10 g/m$^2$, 10-15 g/m$^2$, or 15-20 g/m$^2$.

During the preparation of the separator of the present invention, the liquid bonding material is cooled and solidified at room temperature or in a low-temperature environment to form a bonding layer without introducing water and a volatile solvent. The coating does not require heating and drying processes, the coated bonding material does not add water and other liquid components other than ethylene carbonate, and has few volatile substances. Since there are no heating and drying systems, the required energy consumption is also greatly reduced. In addition, because the coating process does not require heating, the influence of high temperature during drying on the separator substrate such as wrinkling and shrinkage can be avoided.

In some embodiments, a separator produced by the method is the separator described in the first aspect of the present application.

The storage temperature of the separator of the secondary battery of the present invention needs to be lower than 35° C.

According to a third aspect, use of ethylene carbonate as a bonding material for producing a separator of a secondary battery is provided. The ethylene carbonate has a melting point of 35° C., and it rapidly melts above the melting point, wets surfaces of a separator and an electrode, and crystallizes and solidifies when it is cooled below the melting point, thereby completing the interface adhesion of the separator and the electrode. Due to the good fluidity of ethylene carbonate, good adhesion of the separator and electrode sheet may be quickly achieved, and the hot-pressing time can be shortened to less than 3 s.

In addition, a secondary battery, a battery module, a battery pack, and a power consumption apparatus of the present application will be described below with reference to the accompanying drawings as appropriate.

According to an embodiment of the present application, a secondary battery is provided.

Generally, a secondary battery includes a positive electrode sheet, a negative electrode sheet, an electrolyte, and a separator. During charging and discharging of a battery, active ions are intercalated and deintercalated back and forth between the positive electrode sheet and the negative electrode sheet. The electrolyte plays a role of conducting ions between the positive electrode sheet and the negative electrode sheet. The separator is disposed between the positive electrode sheet and the negative electrode sheet, which mainly plays the role of preventing a short circuit between the positive and negative electrodes while allowing ions to pass through.

[Positive Electrode Sheet]

In a secondary battery of the present application, a positive electrode sheet may include a positive electrode current collector and a positive material layer that is disposed on the positive electrode current collector and that includes a positive active material, and the positive material layer may be disposed on one surface of the positive electrode current collector or on both surfaces of the positive electrode current collector.

In some embodiments, the positive electrode current collector may be a metal foil or a composite current collector. For example, as the metal foil, an aluminum foil may be used. The composite current collector may include a polymer material base layer and a metal layer formed on at least one surface of the polymer material base layer. The composite current collector may be formed by synthesizing a metal material (aluminum, aluminum alloy, nickel, nickel alloy, titanium, titanium alloy, silver, silver alloy, or the like) on a polymer material substrate (such as a substrate of polypropylene (PP), polyethylene terephthalate (PET), polybutylene terephthalate (PBT), polystyrene (PS), polyethylene (PE), or the like).

In some embodiments, the positive active material may employ a positive active material for a battery known in the art. As an example, the positive active material may include at least one of the following materials: a lithium containing phosphate in an olivine structure, a lithium transition metal oxide and their respective modified compounds. However, the present application is not limited to these materials, and other conventional materials that can be used as a positive active material for a battery may also be used. One type of these positive active materials may be used alone, or two or more types thereof may be used in combination. Examples of the lithium transition metal oxide may include, but are not limited to, at least one of lithium cobalt oxides (such as $LiCoO_2$), lithium nickel oxides (such as $LiNiO_2$), lithium manganese oxides (such as $LiMnO_2$, $LiMn_2O_4$), lithium nickel cobalt oxides, lithium manganese cobalt oxides, lithium nickel manganese oxides, lithium nickel cobalt manganese oxides (such as $LiNi_{1/3}Co_{1/3}Mn_{1/3}O_2$ ($NCM_{333}$ for short), $LiNi_{0.5}Co_{0.2}Mn_{0.3}O_2$ ($NCM_{523}$ for short), $LiNi_{0.5}Co_{0.25}Mn_{0.25}O_2$ ($NCM_{211}$ for short), $LiNi_{0.5}Co_{0.2}Mn_{0.2}O_2$ ($NCM_{622}$ for short), $LiNi_{0.8}Co_{0.1}Mn_{0.1}O_2$ ($NCM_{811}$ for short)), lithium nickel cobalt aluminum oxides (such as $LiNi_{0.8}Co_{0.1}Al_{0.05}O_2$), their modified compounds, or the like. Examples of the lithium containing phosphate in the olivine structure may include, but are not limited to, at least one of lithium iron phosphate (such as $LiFePO_4$ (LFP for short)), composite materials of lithium iron phosphate and carbon, lithium manganese phosphate (such as $LiMnPO_4$), composite materials of lithium manganese phosphate and carbon, lithium manganese iron phosphate, and composite materials of lithium manganese iron phosphate and carbon.

In some embodiments, the positive material layer also optionally includes a bonding agent. Types and contents of the conductive agent and the bonding agent are not specifically limited, and may be selected according to actual needs. As an example, the bonding agent may include at least one of polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer and fluoro containing acrylate resin.

In some embodiments, the positive material layer also optionally includes a conductive agent. As an example, the conductive agent may include at least one of superconducting carbon, acetylene black, carbon black, Ketjen black, carbon dots, carbon nanotubes, graphene, and carbon nanofibers.

In some embodiments, the positive electrode sheet may be prepared in the following manner. The foregoing components for preparing the positive electrode sheet such as the positive active material, the conductive agent, the bonding agent, and any other components are dispersed in a solvent (such as N-methylpyrrolidone), to form a positive electrode slurry, the positive electrode slurry is coated on the positive electrode current collector, and then after drying, cold pressing and other processes, a positive electrode sheet may be obtained.

In some embodiments, the positive material layer includes lithium iron phosphate, acetylene black as a conductive agent, and polyvinylidene fluoride (PVDF) as a bonding agent. The positive electrode sheet may be prepared in the following manner. Lithium iron phosphate, acetylene black as a conductive agent, and polyvinylidene fluoride (PVDF) as a bonding agent are mixed in a mass ratio uniformly and then added into N-methyl-2-pyrrolidone (NMP) as a solvent, to obtain a positive electrode slurry with a certain viscosity; and the positive electrode slurry is uniformly coated on an aluminum foil of the positive electrode current collector, and after performing drying, cold pressing, module cutting, and slitting, a positive electrode sheet for a secondary battery is obtained.

[Negative Electrode Sheet]

In a secondary battery of the present application, a negative electrode sheet may include a negative electrode current collector and a negative material layer that is disposed on the negative electrode current collector and that includes a negative active material, and the negative material layer may be disposed on one surface of the negative electrode current collector or on both surfaces of the negative electrode current collector.

In some embodiments, the negative electrode current collector may be a metal foil or a composite current collector. For example, as the metal foil, a copper foil may be used. The composite current collector may include a polymer material base layer and a metal layer formed on at least one surface of the polymer material substrate. The composite current collector may be formed by synthesizing a metal material (copper, copper alloy, nickel, nickel alloy, titanium, titanium alloy, silver, silver alloy, or the like) on a polymer material substrate (such as a substrate of polypropylene (PP), polyethylene terephthalate (PET), polybutylene terephthalate (PBT), polystyrene (PS), polyethylene (PE), or the like).

In some embodiments, the negative active material may employ a negative active material for a battery known in the art. As an example, the negative active material may include at least one of graphite (such as artificial graphite, natural graphite), soft carbon, hard carbon, mesocarbon microbeads, carbon fibers, carbon nanotubes, silicon-based materials, tin-based materials, lithium titanate, or the like. The silicon-based material may be selected from at least one of elemental silicon, silicon-oxygen compounds, silicon-carbon composites, silicon-nitrogen composites, and silicon alloys. The tin-based material may be selected from at least one of elemental tin, tin oxide compounds, and tin alloys. However, the present application is not limited to these materials, and other conventional materials that can be used as a negative active material for a battery may also be used. One type of these negative active materials may be used alone, or two or more types thereof may be used in combination.

In some embodiments, the negative material layer also optionally includes a bonding agent. The bonding agent may be selected from at least one of styrene-butadiene rubber (SBR), polyacrylic acid (PAA), polyacrylate sodium (PAAS), polyacrylamide (PAM), polyvinyl alcohol (PVA), sodium alginate (SA), polymethacrylic acid (PMAA), and carboxymethyl chitosan (CMCS).

In some embodiments, the negative material layer also optionally includes a conductive agent. The conductive agent may be selected from at least one of superconducting carbon, acetylene black, carbon black, Ketjen black, carbon dots, carbon nanotubes, graphene, and carbon nanofibers.

In some embodiments, the negative material layer includes graphite as a negative active material, acetylene black as a conductive agent, and styrene-butadiene rubber (SBR) as a bonding agent.

In some embodiments, the negative material layer also optionally includes other adjuvants, for example, thickening agents (such as sodium carboxymethyl cellulose (CMC-Na)), or the like.

In some embodiments, the negative electrode sheet may be prepared in the following manner. The foregoing components for preparing the negative electrode sheet such as the negative active material, the conductive agent, the bonding agent, and any other components are dispersed in a solvent (such as deionized water), to form a negative electrode slurry, the negative electrode slurry is coated on the negative electrode current collector, and then after drying, cold pressing and other processes, a negative electrode sheet may be obtained.

In some embodiments, the negative material layer includes graphite as an active material, acetylene black as a conductive agent, sodium hydroxymethyl cellulose (CMC) as a thickening agent, and styrene-butadiene rubber (SBR) as a bonding agent. The negative electrode sheet may be prepared in the following manner. Graphite as a negative active material, acetylene black as a conductive agent, sodium hydroxymethyl cellulose (CMC) as a thickening agent, and styrene-butadiene rubber (SBR) as a bonding agent are mixed in a mass ratio uniformly, and then added into water as a solvent, to obtain a negative electrode slurry; and the negative electrode slurry is uniformly coated on a copper foil of the negative electrode current collector, and after performing drying, cold pressing, module cutting, and slitting, a negative electrode sheet for a secondary battery is obtained.

[Electrolyte]

The electrolyte plays the role of conducting ions between the positive electrode sheet and the negative electrode sheet. The type of the electrolyte is not specifically limited in the present application, and may be selected according to needs. For example, the electrolyte may be in a liquid state, gel state, or all solid state.

In some embodiments, the electrolyte is an electrolytic solution. The electrolytic solution includes an electrolyte salt and a solvent.

In some embodiments, the electrolyte salt may be selected from at least one of lithium hexafluorophosphate, lithium tetrafluoroborate, lithium perchlorate, lithium hexafluoro arsenate, lithium bisfluorosulfonimide, lithium bistrifluoromethanesulfonimide, lithium trifluoromethanesulfonate, lithium difluorophosphate, lithium difluorooxalateborate, lithium bisoxalateborate, lithium difluorobisoxalate phosphate, and lithium tetrafluorooxalate phosphate.

In some embodiments, the solvent may be selected from at least one of ethylene carbonate, propylene carbonate, ethyl methyl carbonate, diethyl carbonate, dimethyl carbonate, dipropyl carbonate, methyl propyl carbonate, ethylene propyl carbonate, butylene carbonate, fluoroethylene carbonate, methyl formate, methyl acetate, ethyl acetate, propyl acetate, methyl propionate, ethyl propionate, propyl propionate, methyl butyrate, ethyl butyrate, 1,4-butyrolactone, sulfolane, methyl sulfonyl methane, ethyl methyl sulfone, and diethyl sulfone.

In some embodiments, the electrolytic solution also optionally includes an additive. For example, the additive may include a negative electrode film-forming additive, a positive electrode film-forming additive, and an additive capable of improving specific performance of the battery, for example, an additive for improving overcharge performance of the battery, or an additive for improving high-temperature or low-temperature performance of the battery, or the like.

In some embodiments, the electrolyte may be prepared in the following manner. Lithium hexafluorophosphate is dissolved in a mixed solvent of ethylene carbonate, dimethyl carbonate, and ethyl methyl carbonate, and a desired electrolytic solution is obtained.

The secondary battery of the present application may be a lithium-ion battery.

The secondary battery of the present application may be prepared using a conventional method. In some embodiments, the positive electrode sheet, the negative electrode sheet, and the separator may be subject to a winding process or a lamination process, to obtain an electrode assembly. Exemplarily, the preparation method includes:

step 1: stacking a positive electrode sheet, a separator, and a negative electrode sheet in order, so that the separator is placed between the positive and negative electrode sheets, and then performing winding to obtain an electrode assembly (a bare cell); and step 2: placing the electrode assembly into a housing of a secondary battery, drying it, injecting an electrolytic solution, and performing processes such as forming, and gas exhausting, to obtain a secondary battery.

In some embodiments, the secondary battery of the present application may include an outer package. The outer package may be used to package the foregoing electrode assembly and electrolyte.

In some embodiments, the outer package of the secondary battery may be a hard shell such as a hard plastic shell, an aluminum shell, or a steel shell. In some embodiments, the outer package of the battery cell may be a soft package, such as a bag-type soft package. A material of the soft package may be plastic, for example, polypropylene, polybutylene terephthalate, and polybutylene succinate.

Figure 1:
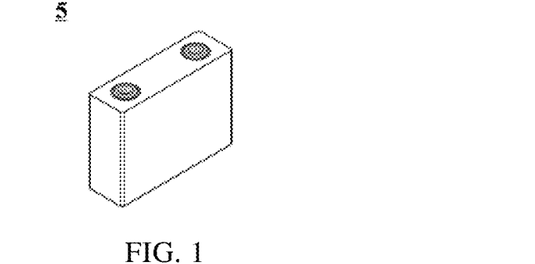
FIG. 1 is a schematic diagram of a secondary battery according to an embodiment of the present application.

The present application has no particular limitation on the shape of the secondary battery, which may be a cylinder, a square, or any other shape. For example, FIG. 1 shows a secondary battery 5 of a square structure as an example.

Figure 2:
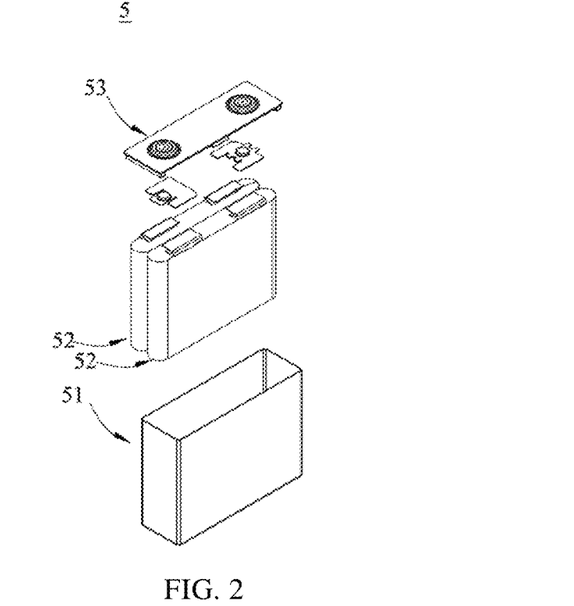
FIG. 2 is an exploded view of a secondary battery according to the embodiment of the present application shown in FIG. 1.

In some embodiments, referring to FIG. 2, the outer package may include a housing 51 and a cover plate 53. The housing 51 may include a bottom plate and a side plate connected to the bottom plate. The bottom plate and the side plate are enclosed to form an accommodating cavity. The housing 51 has an opening communicating with the accommodating cavity, and the cover plate 53 can cover the opening to close the accommodating cavity. A positive electrode sheet, a negative electrode sheet, and a separator may be subject to a winding process or a lamination process to form an electrode assembly 52. The electrode assembly 52 is packaged in the accommodating cavity. The electrolytic solution is infiltrated in the electrode assembly 52. The number of electrode assemblies 52 included in the secondary battery 5 may be one or more, and the specific number may be selected by persons skilled in the art according to specific actual needs.

In some embodiments, secondary batteries may be assembled into a battery module, and the number of secondary batteries included in the battery module may include one or more, and the specific number may be selected by persons skilled in the art according to application and capacity of the battery module.

Figure 3:
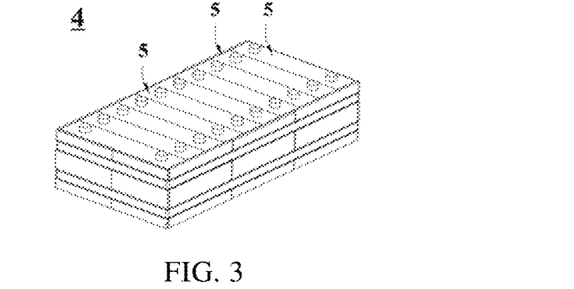
FIG. 3 is a schematic diagram of a battery module according to an embodiment of the present application.

FIG. 3 shows a battery module 4 as an example. Referring to FIG. 3, in the battery module 4, a plurality of secondary batteries 5 may be sequentially arranged along a length direction of the battery module 4. Certainly, they may be arranged in accordance with any other manner. Further, the plurality of secondary batteries 5 may be fixed by using fasteners.

Optionally, the battery module 4 may further include a shell with an accommodating space, and the plurality of secondary batteries 5 are accommodated in the accommodating space.

In some embodiments, battery modules may be further assembled into a battery pack, and the number of battery modules included in the battery pack may be one or more, and the specific number may be selected by persons skilled in the art according to application and capacity of the battery pack.

Figure 4:
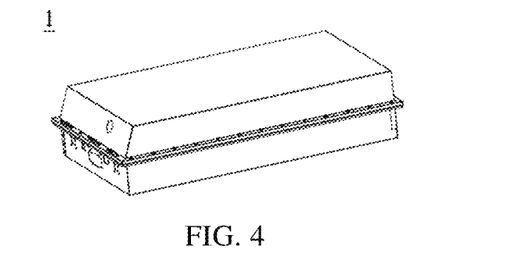
FIG. 4 is a schematic diagram of a battery pack according to an embodiment of the present application.
Figure 5:
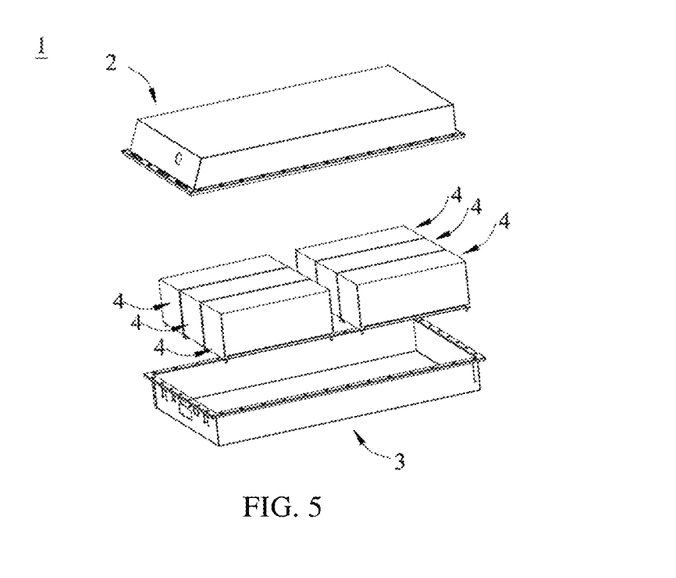
FIG. 5 is an exploded view of a battery pack according to the embodiment of the present application shown in FIG. 4.

FIG. 4 and FIG. 5 show a battery pack 1 as an example. Referring to FIG. 4 and FIG. 5, the battery pack 1 may include a battery box and a plurality of battery modules 4 disposed in the battery box. The battery box includes an upper box 2 and a lower box 3. The upper box 2 can cover the lower box 3 and form an enclosed space for accommodating the battery modules 4. The plurality of battery modules 4 may be arranged in the battery box in any manner.

In addition, the present application also provides a power consumption apparatus including a secondary battery, a battery module, or a battery pack provided in the present application. The secondary battery, battery module, or battery pack may be used as a power source for the power consumption apparatus as well as an energy storage unit for the power consumption apparatus. The power consumption apparatus may be selected from a mobile device (for example, a mobile phone, a notebook computer), an electric vehicle (for example, a pure electric vehicle, a hybrid electric vehicle, a plug-in hybrid electric vehicle, an electric bicycle, an electric scooter, an electric golf cart, an electric truck), an electric train, a ship and a satellite, an energy storage system, or the like, but is not limited to this. As the power consumption apparatus, a secondary battery, a battery module, or a battery pack may be selected according to usage requirements.

Figure 6:
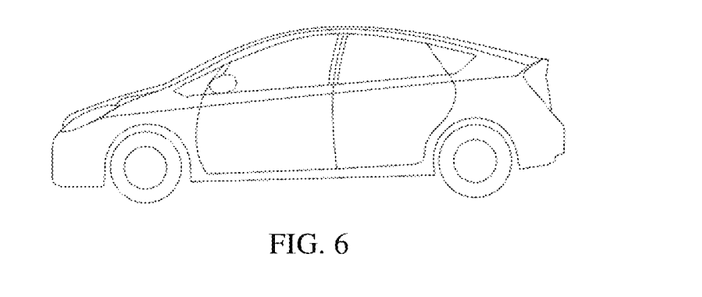
FIG. 6 is a schematic diagram of a power consumption apparatus in which a secondary battery is used as a power source according to an embodiment of the present application.

FIG. 6 shows a power consumption apparatus as an example. The power consumption apparatus is a pure electric vehicle, a hybrid electric vehicle, a plug-in hybrid electric vehicle, or the like. To meet a requirement of the power consumption apparatus for high power and high energy density of a secondary battery, a battery pack or a battery module may be used.

In another example, the apparatus may be a mobile phone, a tablet computer, a notebook computer, or the like. The apparatus usually requires lightness and thinness, and a secondary battery may be used as a power source.

Embodiment

Hereinafter, an embodiment of the present application will be described. The embodiments described below are illustrative, only used to explain the present application, and should not be construed as a limitation to the present application. Where specific techniques or conditions are not specified in the embodiments, they are performed according to techniques or conditions described in the literature in the art or according to product specifications. The reagents or instruments used without specifying the manufacturer are conventional products that can be obtained from the market.

Preparation of Separator

Comparative Example 1

(1) Preparation of Coating Material

Stir 7.99 kg of deionized water, 0.70 kg of polyacrylonitrile latex (LA133, 15% solid content), 1.30 kg of PVDF (AKEMA LBG), 0.01 kg of defoamer (BYK, LPD 24513) in a double planetary blender (Ross, DPD-4R) for 2 h, and mix them uniformly, to obtain a coating solution.

(2) Separator Coating

Select a 12 μm polypropylene substrate microporous separator, uniformly spray the coating solution prepared in step (1) sprayed to a surface of the separator by using a spraying machine, dry it at 55° C., and perform rewinding, to obtain a separator of Comparative Example 1.

Comparative Example 2

(1) Preparation of Coating Material

Add 9.50 kg of ethylene carbonate into a blender (Ross, DPD-4R) with a heating system and a dispersing plate, keep it at 60° C. for 1 h, after the ethylene carbonate melts completely, add 0.50 kg of PVDF (AKEMA LBG), stir them for 2 h, and mix them uniformly, to obtain a coating solution.

(2) Separator Coating

Select a 12 μm polypropylene substrate microporous separator, uniformly spray the coating solution prepared in step (2) to a surface of a separator by using a spraying machine, and perform cooling and rewinding, to obtain a separator of Comparative Example 2.

Embodiment 1

Preparation of Separator Bonding Material 1
(1) Add 10.00 kg of ethylene carbonate into a blender (Ross, DPD-4R) with a heating system and a dispersing plate, keep it at 60° C. for 1 h, and after the ethylene carbonate melts completely, obtain a separator bonding material 1.
(2) Separator Coating Select a 12 μm polypropylene substrate microporous separator, uniformly spray the separator bonding material 1 to a surface of a separator by using a spraying machine (KATOP) with a heating spraying system, with a coating weight of 1.5±0.2 g/m², perform cooling at 7-10° C. with a low-temperature box, and perform rewinding, to obtain a separator for a lithium secondary battery of Embodiment 1.

Embodiment 2

(1) Preparation of Separator Bonding Material 2

Add 9.90 kg of ethylene carbonate into a blender with a heating system and a dispersing plate, keep it at 60° C. for 1 h, after the ethylene carbonate melts completely, add 0.10 kg of nano silicon micropowder (NYACOL S125M, with a primary particle size of 70-80 nm), and dispersedly stir them for 1 h, to obtain a separator bonding material 2.

(2) Separator Coating

Select a 12 μm polypropylene substrate microporous separator, uniformly spray the separator bonding material 2 to a surface of a separator by using a spraying machine (KATOP) with a heating spraying system, with a coating weight of 1.5±0.2 g/m², and perform cooling and rewinding, to obtain a separator for a lithium secondary battery of Embodiment 2.

Embodiment 3

(1) Preparation of Separator Bonding Material 3

Add 9.95 kg of ethylene carbonate into a blender with a heating system and a dispersing plate, keep it at 60° C. for 1 h, after the ethylene carbonate melts completely, add 0.05 kg of calcium stearate powder (D50=1.2 μm), and dispersedly stir them for 1 h, to obtain a separator bonding material 3.

(2) Separator Coating

Select a 12 μm polypropylene substrate microporous separator, uniformly spray the separator bonding material 3 to a surface of a separator by using a spraying machine with a heating spraying system, with 1.5±0.2 g/m², and perform cooling and rewinding, to obtain a separator for a lithium secondary battery of Embodiment 3.

Embodiment 4

(1) Preparation of Separator Bonding Material 4

Add 9.50 kg of ethylene carbonate into a blender with a heating system and a dispersing plate, keep it at 60° C. for 1 h, after the ethylene carbonate melts completely, add 0.50 kg of nano silicon micropowder (NYACOL S125M, with a primary particle size of 70-80 nm), and dispersedly stir them for 1 h, to obtain a separator bonding material 4.

(2) Separator Coating

Select a 12 μm polypropylene substrate microporous separator, uniformly spray the separator bonding material 4 to a surface of a separator by using a spraying machine with a heating spraying system, with 1.5±0.2 g/m², and perform cooling and rewinding, to obtain a separator for a lithium secondary battery of Embodiment 4.

Embodiment 5

(1) Preparation of Separator Bonding Material 5

Add 9.00 kg of ethylene carbonate into a blender with a heating system and a dispersing plate, keep it at 60° C. for 1 h, after the ethylene carbonate melts completely, add 1.00 kg of alumina powder (D50=1 μm), and dispersedly stir them for 1 h, to obtain a separator bonding material 5.

(2) Separator Coating

Select a 12 μm polypropylene substrate microporous separator, uniformly spray the separator bonding material 5 to a surface of a separator by using a spraying machine with a heating spraying system, with a coating weight of 1.5±0.2 g/m², and perform cooling and rewinding, to obtain a separator for a lithium secondary battery of Embodiment 5.

Preparation of Positive Electrode Sheet: Uniformly mix lithium iron phosphate, acetylene black as a conductive agent, and polyvinylidene fluoride (PVDF) as a bonding agent in a mass ratio of 97:2:1, and add them into N-methyl-2-pyrrolidone (NMP) as a solvent, to obtain a positive electrode slurry with a certain viscosity; and evenly coat the positive electrode slurry onto an aluminum foil of a positive electrode current collector, and perform drying, cold pressing, module cutting, and slitting, to a positive electrode sheet for a lithium-ion battery.

Preparation of Negative Electrode Sheet: Uniformly mix graphite as a negative active material, acetylene black as a conductive agent, sodium hydroxymethyl cellulose (CMC) as a thickening agent, and styrene-butadiene rubber (SBR) as a bonding agent in a mass ratio of 96:2:1:1, and add them into water as a solvent, to obtain a negative electrode slurry; and evenly coat the negative electrode slurry to a copper foil of a negative electrode current collector, and perform drying, cold pressing, module cutting, and slitting, to obtain a negative electrode sheet for a lithium-ion battery.

Preparation of Electrolytic Solution: Dissolve lithium hexafluorophosphate in a mixed solvent of ethylene carbonate, dimethyl carbonate, and ethyl methyl carbonate (a volume ratio of ethylene carbonate, dimethyl carbonate, and ethyl methyl carbonate is 1:2:1), to obtain a desired electrolytic solution.

Preparation of lithium-ion battery: Make the foregoing positive electrode sheet, negative electrode sheet, and separator into a laminated structure, and perform hot-pressing, to obtain a bare cell; and perform processes such as packaging, liquid injection, formation, exhausting, to obtain a lithium-ion battery.

Separator Test:

Areal Density Test: In a direction perpendicular to a coating direction of a separator, cut 100 mm×100 mm samples from the left part, middle part, and right part of the separator, respectively, and weigh them on an analytical balance with an accuracy of 1/10,000 (0.0001), to calculate an average value of areal density of the three samples, which is recorded as areal density of the separator in the unit of g/m², with a formula as follows:

$$\text{Areal density (g/m}^2\text{)=sample mass (g)/0.01 (m2)}.$$

Thickness Test: In a direction perpendicular to a coating direction of a separator, cut 100 mm×100 mm samples from the left part, middle part, and right parts of the separator, respectively, and measure thicknesses of intermediate portions of the samples by using a film thickness gauge (Mahr, Millimar C1208), to calculate a mean value of the thicknesses of the three samples, which is recorded as a thickness of the separator in the unit of μm.

Bonding Force Test: Stack the coated separator with a positive electrode sheet and a negative electrode sheet flat, respectively, and perform hot pressing at 50° C. for 3 s with a pressure of 1T by using a flat plate hot press, and then take it out and perform cooling; and after cooling, cut it into a sample with a length of 150 mm and a width of 20 mm by a cutter, and test peel strength of the sample with a universal tensile machine (Instron 3365) according to a test method specified in GB/T2790-1995 *Adhesive, 180° Peel Strength Test Method For a Flexible-bonded-to-rigid Test Specimen Assembly*, where the unit of peel strength is N/m.

Air Permeability Test: In a direction perpendicular to a coating direction of a separator, cut 100 mm×100 mm samples from the left part, middle part, and right part of the separator, respectively, and test air permeability of the separator by using a digital Oken type air-permeability tester (AsahiSeiko, EGO1-65-2MR), to calculate average air permeability of the three samples, which is recorded as air permeability of the separator in the unit of s/100 CC.

Ionic Conductivity Test: Cut a separator into 40 mm×20 mm samples, stack the cut separators in groups of 4 layers, fully wet the separators with a commercial electrolytic solution, and then assemble them in a glove box into a symmetric battery cell for testing; and measure impedance of the separator by using an electrochemical workstation over a range of 1 Hz to 100,000 Hz with an applied AC signal polarization of 5 mV, to calculate ionic conductivity based on test results of AC impedance, with a formula as follows:

$$\delta = 1000 L/RA$$

where δ represents ionic conductivity in the unit of mS/cm; A represents an area of a separator tested in the unit of $cm^2$, L represents a thickness of the separator tested, and R represents resistance of the separator tested.

First Charge and Discharge Efficiency Test

First Charge Capacity: Charge a battery cell until a voltage is 3.65V at a constant current of 0.01C, where an electric quantity used is recorded as a first charge capacity in the unit of mAh.

First Discharge Capacity: Perform discharging on the battery cell at a constant current of 0.1C until a voltage is 2.0V, where a discharge electric quantity during this process is recorded as a first discharge capacity in the unit of mAh.

First Charge and Discharge Efficiency=First Discharge Capacity/First Charge Capacity×100%.

The test results are shown in Table 1. Table 2 shows formulations of Embodiments and Comparative Examples.

TABLE 1

| Test items | | Polypropylene microporous separator | Comparative example 1 | Comparative example 2 | Embodiment 1 | Embodiment 2 | Embodiment 3 | Embodiment 4 | Embodiment 5 |
|---|---|---|---|---|---|---|---|---|---|
| Areal density (g/m$^2$) | | 7.0 | 10.0 | 10.0 | 10.0 | 10.0 | 10.0 | 11.0 | 12.0 |
| Thickness (μm) | | 12 | 32 | 34 | 30 | 30 | 30 | 32 | 30 |
| Air permeability (S/100 CC) | | 220 | 260 | 270 | 258 | 255 | 253 | 272 | 285 |
| Bonding Force (N/m) | Separator/Positive electrode | 0 | 0.3 | 3.2 | 2.5 | 2.3 | 2.4 | 2.8 | 2.9 |
| | Separator/Negative electrode | 0 . . . | 0.2 | 2.7 | 2.7 | 2.5 | 2.5 | 2.7 | 2.8 |
| Ionic conductivity (mS/cm) | | 0.52 | 0.45 | 0.33 | 0.53 | 0.54 | 0.53 | 0.50 | 0.43 |
| First charge and discharge efficiency (%) | | 94.5 | 92.5 | 91.8 | 94.5 | 94.4 | 94.3 | 93.8 | 94.3 |

TABLE 2

| | Base film | Bonding layer material | Ethylene carbonate content (kg) | Nucleating agent (kg) | PVDF (LBG) (kg) | Acrylonitrile latex (LA133) (kg) | Deionized water (kg) | Others (defoamer LPD 24513) kg |
|---|---|---|---|---|---|---|---|---|
| Embodiment 1 | Polypropylene | Ethylene carbonate | 10.0 | 0 | 0 | 0 | 0 | 0 |
| Embodiment 2 | Polypropylene | Ethylene carbonate + Nano silicon micropowder | 9.90 | 0.10 (Nano silicon micropowder) | 0 | 0 | 0 | 0 |
| Embodiment 3 | Polypropylene | Ethylene carbonate + calcium stearate powder | 9.95 | 0.05 (Calcium stearate powder) | 0 | 0 | 0 | 0 |
| Embodiment 4 | Polypropylene | Ethylene carbonate + Nano silicon micropowder | 9.50 | 0.50 (Nano silicon micropowder) | 0 | 0 | 0 | 0 |
| Embodiment 5 | Polypropylene | Ethylene carbonate + Alumina | 9.00 | 1.00 (Alumina) | 0 | 0 | 0 | 0 |
| Comparative example 1 | Polypropylene | Polyacrylonitrile latex + PVDF | 0 | 0 | 1.30 | 0.70 | 7.99 | 0.01 |
| Comparative example 2 | Polypropylene | Ethylene carbonate + PVDF | 10.00 | 0 | 0.50 | 0 | 0 | 0 |

It can be seen from Table 1 that, separators of Embodiments 1 to 5 have better performance in bonding force, ionic conductivity, and/or first charge and discharge efficiency than that of Comparative Example 1, which proves that a separator of the present invention is more advantageous in improving the overall performance of a lithium-ion battery than a separator using polyacrylonitrile latex and PVDF as a bonding material. The separator of Embodiment 1 has better performance in air permeability, ionic conductivity, and first charge and discharge efficiency than that of Comparative Example 2, which proves that even if ethylene carbonate is used alone as a bonding material, the separator can be advantageous in improving the overall performance of a lithium-ion battery compared with a separator in which ethylene carbonate and PVDF both are used as a bonding material. As described above, all of the lithium-ion batteries of Embodiments 1-5 have better overall performance than those of Comparative Examples 1-2. Compared with Embodiments 4-5, Embodiments 1-3 are more favorable for electrical performance of the lithium-ion batteries with the guarantee of bonding force, since the content of ethylene carbonate is 99% to 100%.

It should be noted that the present application is not limited to the foregoing embodiments. The foregoing embodiments are merely examples, and embodiments having substantially the same constitution as the technical idea and exerting the same effects within the technical solution of the present application are all included within the technical scope of the present application. In addition, various modifications may be made to the embodiments by persons skilled in the art without departing from the spirit and scope of the present application, and other embodiments that are constructed by combining some of the constituent elements of the embodiments are also included in the scope of the present application.

What is claimed is:

1. A separator, comprising a porous base film and a bonding layer coated on one or both faces of the porous base film, the bonding layer consists essentially of ethylene carbonate and a nucleating agent,
    wherein the nucleating agent is an inorganic nucleating agent,
    the inorganic nucleating agent is one or more of a metal or non-metal oxide, a hydroxide, a fluoride, a sulfate, a silica, a phosphate, a carbonate, or carbon black, and
    an amount of the nucleating agent added is greater than or equal to 0.5° and less than or equal to 10% and a mass percentage of the ethylene carbonate is equal to or greater than 90% and less than 100% with respect to a total weight of the bonding layer.

2. The separator according to claim 1, wherein the nucleating agent is a powder, and has a particle size expressed by D50 of 0.001-5 μm.

3. The separator according to claim 1, wherein a material of the porous base film is one or more of polypropylene, polyethylene, polyethylene terephthalate, polyimide, polytetrafluoroethylene, polyvinylidene fluoride, vinylidene fluoride-tetrafluoroethylene copolymer, vinylidene fluoride-hexafluoropropylene copolymer, tetrafluoroethylene-propylene copolymer, polyamide, polyacrylonitrile, viscose fiber, and silk fiber.

4. The separator according to claim 1, wherein the porous base film has a thickness of 5-30 μm.

5. The separator according to claim 1, wherein the bonding layer is a continuous coating or a discontinuous coating.

6. The separator according to claim 1, wherein the bonding layer has a coverage of 1-100%.

7. The separator according to claim 1, wherein the bonding layer has a thickness of 0.1-100 μm.

8. The separator according to claim 1, wherein the inorganic nucleating agent is one or more of silica, alumina, and aluminum hydroxide.

9. The separator according to claim 8, wherein the silica is a nano silicon micropowder.

10. The separator according to claim 1, wherein the amount of the nucleating agent added is 0.05% 0.5%-1%.

11. The separator according to claim 1, wherein the mass percentage of the ethylene carbonate is equal to or greater than 99% and less than 100% with respect to a total weight of the bonding layer.

12. A method for producing a separator, the method comprising: coating a bonding material onto one or both faces of a porous base film, and cooling and solidifying the bonding material in an environment at or below room temperature to form a bonding layer, the bonding material consisting essentially of molten ethylene carbonate, and a nucleating agent,
    wherein the nucleating agent is an inorganic nucleating agent, the inorganic nucleating agent is one or more of a metal or non-metal oxide, a hydroxide, a fluoride, a sulfate, a silica, a phosphate, a carbonate, or carbon black, and
    an amount of the nucleating agent added is greater than or equal to 0.5% and less than or equal to 10% and a mass percentage of the ethylene carbonate is equal to or greater than 90% and less than 100% with respect to a total weight of the bonding layer.

13. The method according to claim 12, further comprising:
    melting the ethylene carbonate between 40° C. and 100° C., or mixing the molten ethylene carbonate with the nucleating agent, to obtain the bonding material, wherein a mass fraction ratio of the ethylene carbonate to the nucleating agent is equal to or greater than 90% and less than 100%; and
    after the bonding material is coated onto one or both faces of the porous base film, performing cooling at room temperature or at 7-15° C. with a low-temperature auxiliary, to obtain the separator.

14. The method according to claim 12, wherein the nucleating agent is one or more of silica, alumina, and aluminum hydroxide.

15. The method according to claim 12, wherein an amount of the nucleating agent added is 0.5%-1%.

16. The method according to claim 12, wherein the coating is performed by using one or more of roller coating, spray coating, and dip coating.

17. The method according to claim 12, wherein the coating has a coating weight of 0.5-20 g/m$^2$.

* * * * *

UNITED STATES PATENT AND TRADEMARK OFFICE
CERTIFICATE OF CORRECTION

PATENT NO. : 12,482,898 B2  
APPLICATION NO. : 18/202361  
DATED : November 25, 2025  
INVENTOR(S) : Yuqun Zeng et al.

Page 1 of 1

It is certified that error appears in the above-identified patent and that said Letters Patent is hereby corrected as shown below:

In the Claims

Column 20, Line 15, Claim 10, "0.05% 0.5%-1%" should read -- 0.5%-1% --.

Signed and Sealed this  
Sixth Day of January, 2026

John A. Squires  
*Director of the United States Patent and Trademark Office*